Oct. 2, 1945.     W. E. WOODARD     2,385,957
LOCOMOTIVE POWER REVERSE GEAR
Filed Aug. 1, 1940     8 Sheets-Sheet 1

INVENTOR:
William E. Woodard
BY
Synnestvedt & Lechner
ATTORNEYS.

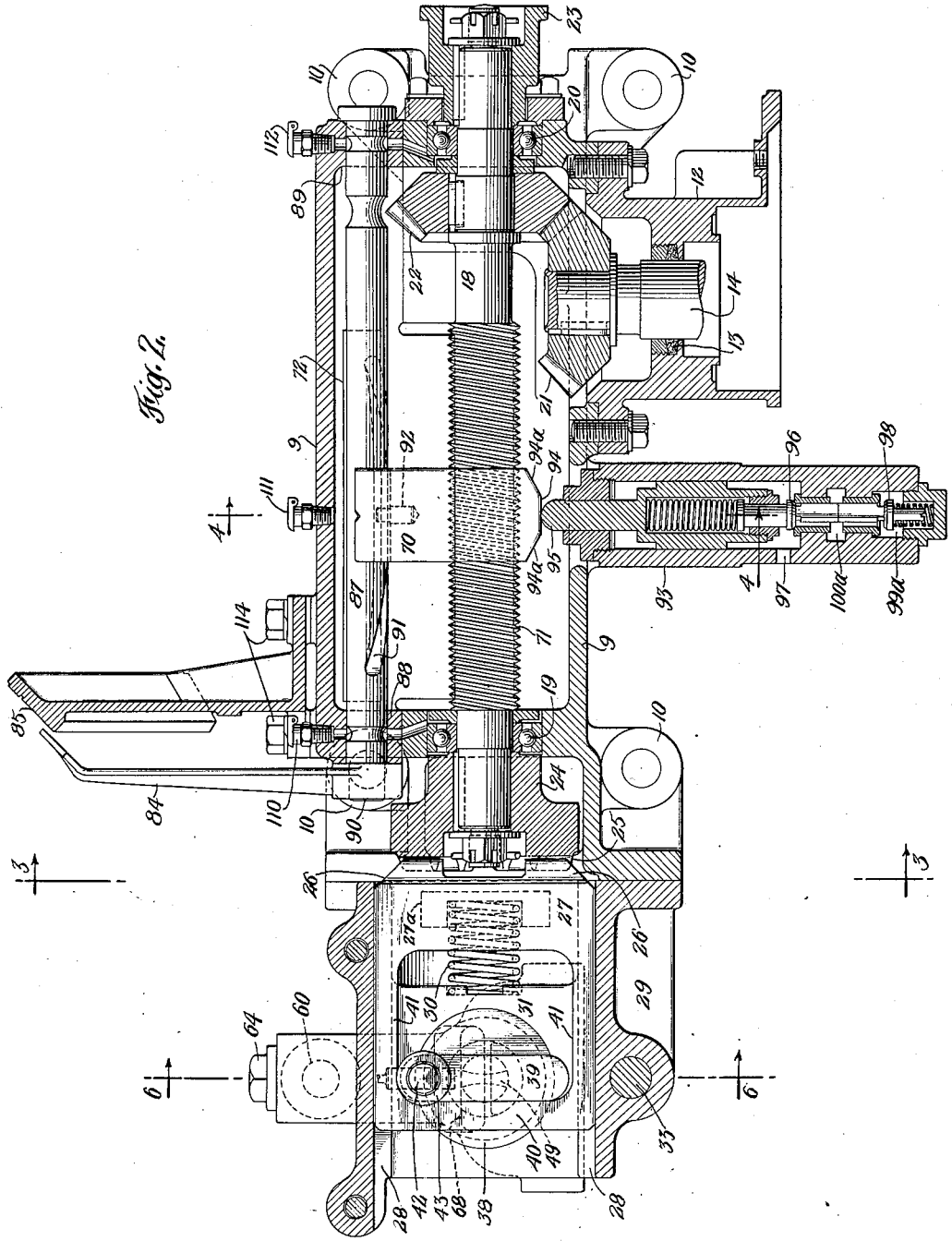

Oct. 2, 1945.    W. E. WOODARD    2,385,957
LOCOMOTIVE POWER REVERSE GEAR
Filed Aug. 1, 1940    8 Sheets-Sheet 3
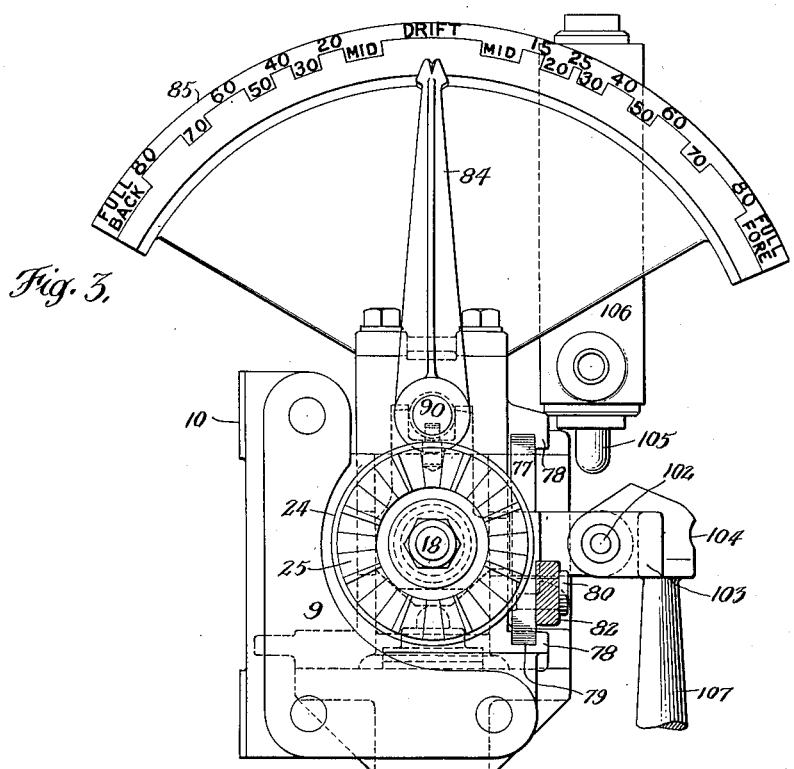
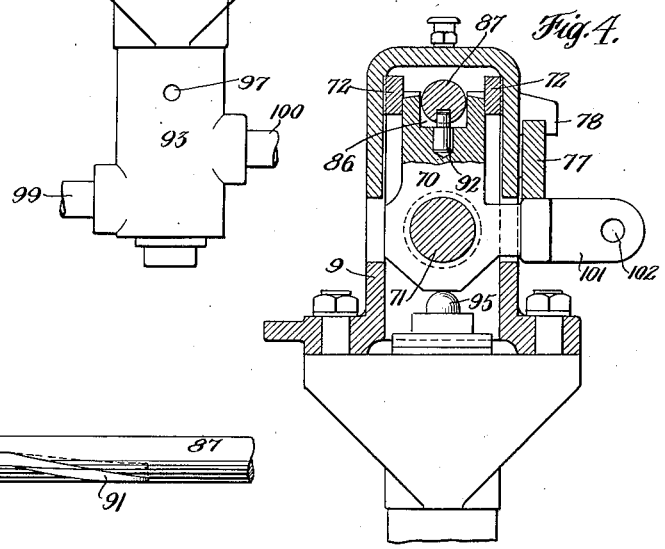
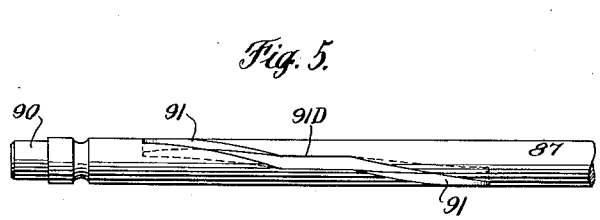
INVENTOR:
William E. Woodard
BY Synnestvedt & Lechner
ATTORNEYS.

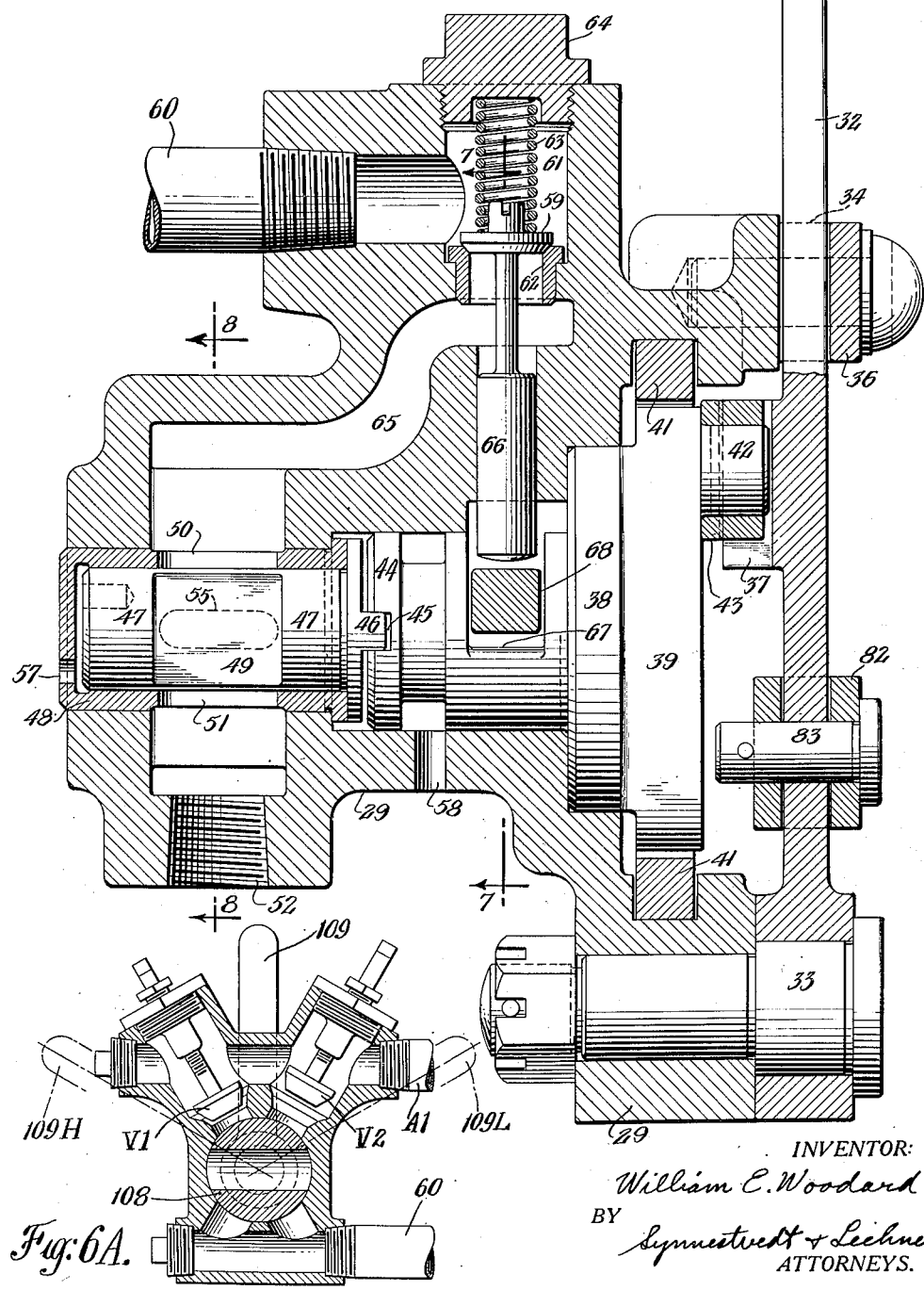

Oct. 2, 1945. W. E. WOODARD 2,385,957
LOCOMOTIVE POWER REVERSE GEAR
Filed Aug. 1, 1940 8 Sheets-Sheet 5

INVENTOR:
William E. Woodard
BY
Synnestvedt & Lechner
ATTORNEYS.

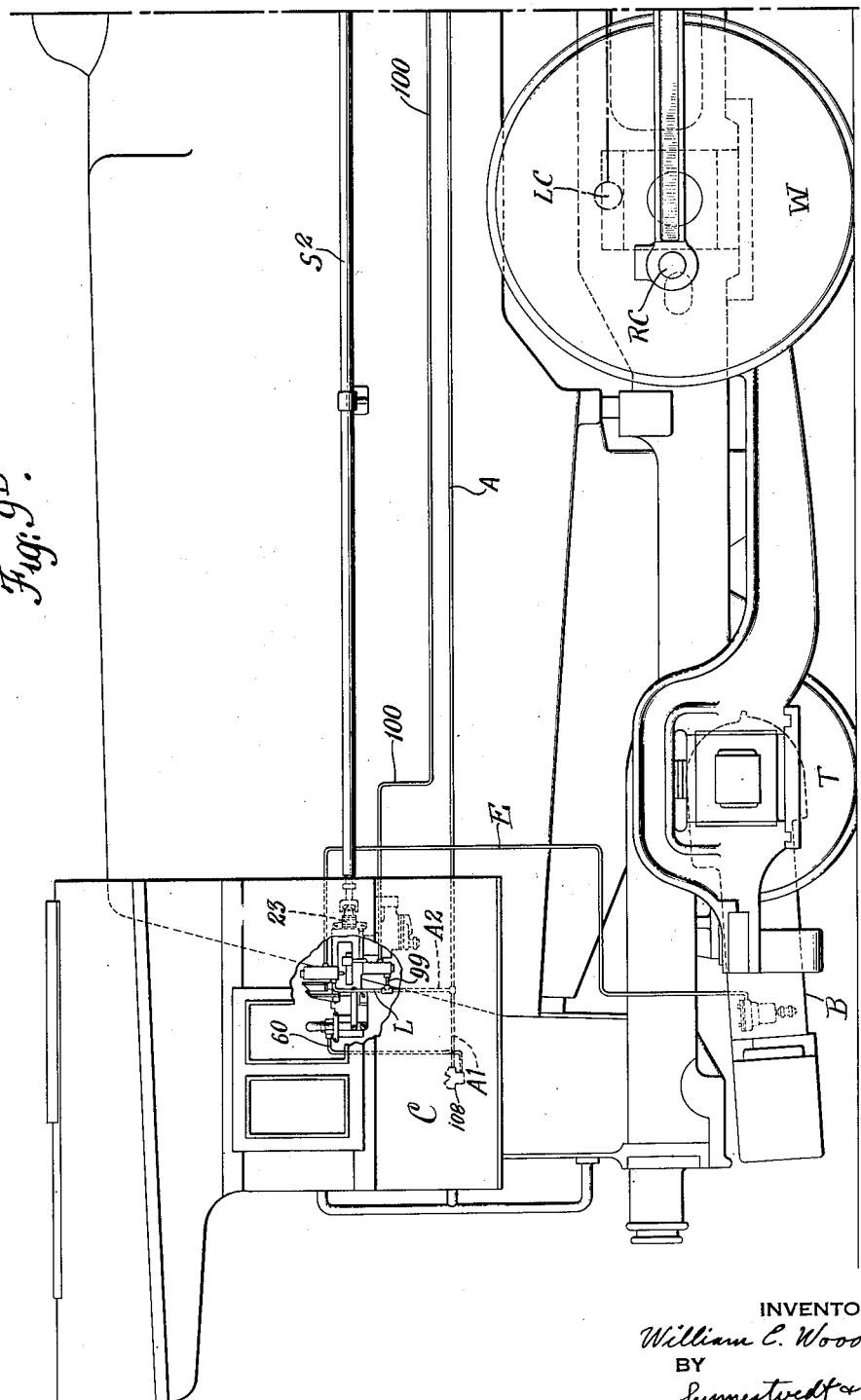

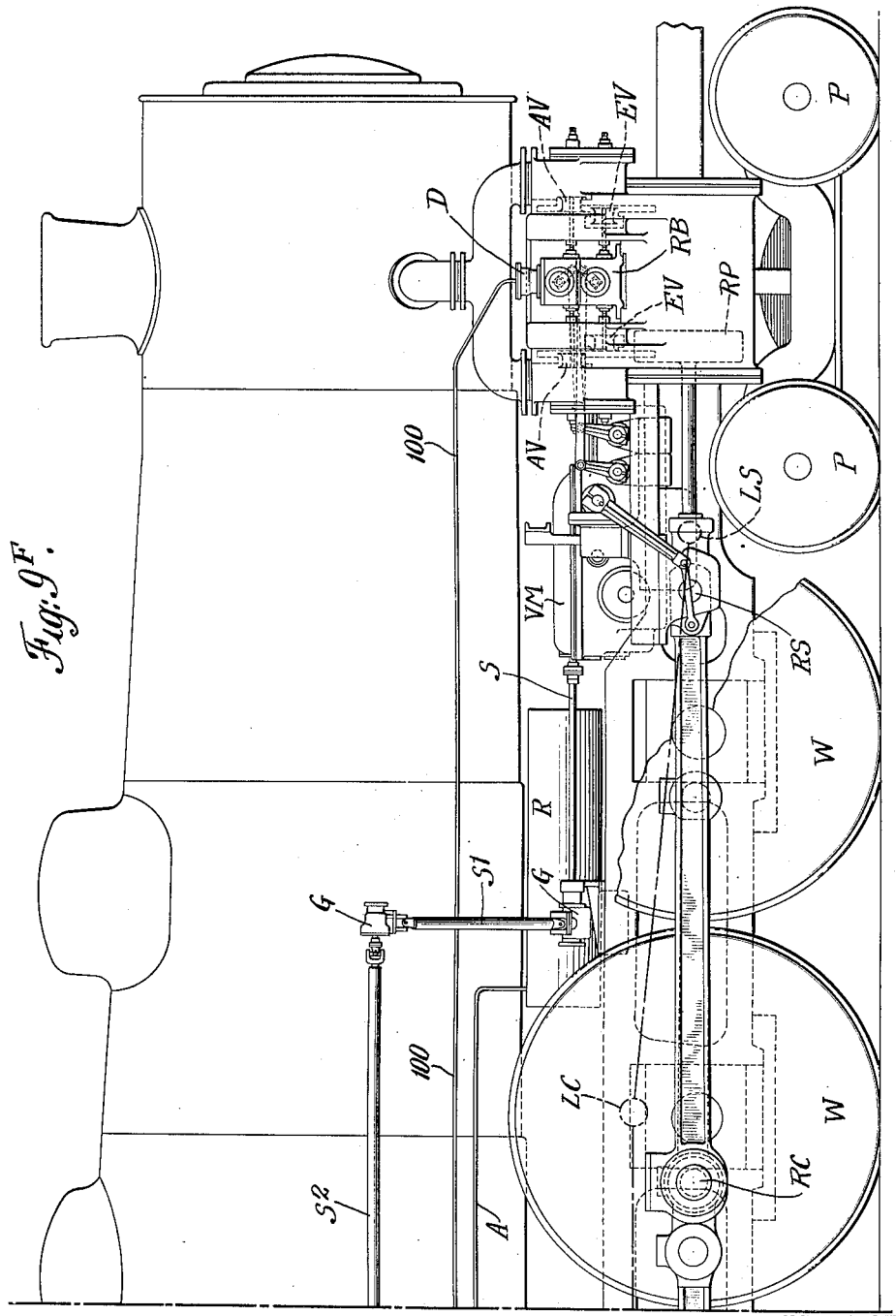

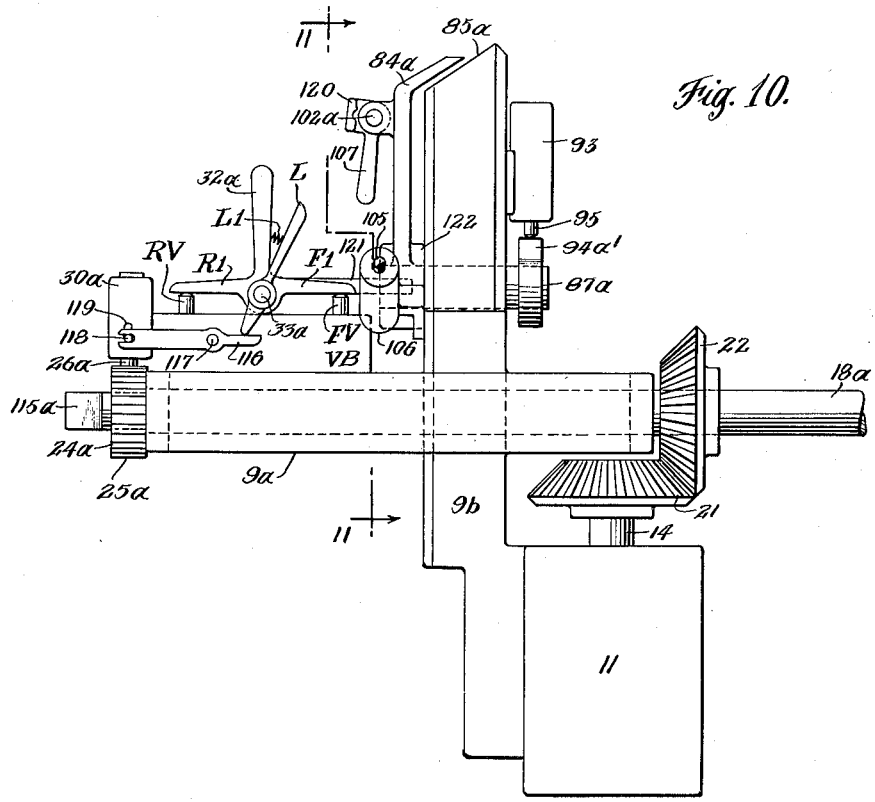
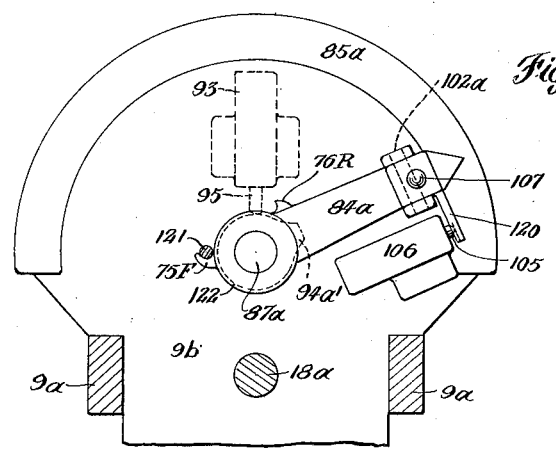

Patented Oct. 2, 1945

2,385,957

UNITED STATES PATENT OFFICE 2,385,957

LOCOMOTIVE POWER REVERSE GEAR

William E. Woodard, Forest Hills, N. Y.; Phebe H. Woodard executrix of said William E. Woodard, deceased, assignor to Phebe H. Woodard, individually Application August 1, 1940, Serial No. 349,162

12 Claims. (Cl. 105—48)

This invention relates to locomotive power reverse gears, through which the valve motion mechanism of a locomotive is set for forward or reverse operation and is adjusted to different positions within either the forward range or the reverse range for altering the timing of the locomotive valves.

Although the invention is of general application in this field, i. e., as a power mechanism for operating any type of reversible valve gear, it is particularly well adapted for two special types of installation, both of which will here be referred to briefly, and one of which will hereinafter be referred to in detail and will be illustrated by two structural embodiments.

The first of the two special uses is as a "pilot" gear, so to speak, wherein the mechanism of the present invention is made of relatively small size and light weight and is utilized to operate any of the known types of power reverse gear, the latter in turn being coupled directly to the valve motion mechanism of the locomotive in the ordinary manner. As an example of this use, assume that a locomotive of large size and power is equipped with a screw-operated power reverse gear (such as the well known "Precision" gear, illustrated at pages 626 and 627 of the Locomotive Cyclopedia of 1930, published by Simmons-Boardman Publishing Company, of New York city, U. S. A.) wherein the adjustment of the reverse gear and thus of the valve motion mechanism is accomplished by rotating the adjusting screw by means of a hand-wheel in the cab. Under certain operating conditions, the work involved in the manual turning of the hand-wheel is a considerable factor, and there is an undesirable time loss in effecting a reversal, for instance when reversing the locomotive to take up slack in the train. In such a locomotive, the power reverse gear of the present invention can advantageously be applied by coupling it up to the screw shaft, in place of the hand-wheel, whereby a rapid and easy operation of the main reverse gear is secured.

The second special type of installation in which the present invention is particularly useful is that wherein the locomotive is equipped with poppet valves or other light-weight valves and a correspondingly light-weight valve motion mechanism, adapted for relatively fine adjustment over a wide range. Such valves and valve motion mechanism are fully disclosed in my copending application, Serial No. 256,874, filed February 17, 1939, now Patent No. 2,234,613, dated July 11, 1941. Another example is shown in the application of Raymond P. Delano, Jr., Serial No. 345,479, filed July 15, 1940, which issued as Patent No. 2,276,290 on March 17, 1942. In the particular installation illustrated in my said application there is also a "drifting" system which automatically opens communication between the two ends of each cylinder of the locomotive when the valve motion mechanism is in a predetermined position of adjustment between the forward and reverse ranges, when the locomotive is drifting or coasting without power. In such an installation, the present invention has the further advantage of placing the drifting mechanism under the direct control of the power reverse gear. Because of these and related advantages, the present invention will hereinafter be described in detail with reference to its use in such an installation, embodying certain features both of the Woodard application and the Delano application.

One of the primary objects of the present invention is the provision of a compact power reverse gear which is quickly and easily controlled and at the same time capable of securing and maintaining unusually fine adjustments, over a wide range of adjustment; the preferred embodiment utilizing a reversible variable-speed motor, a direct-throw lever for operating and reversing the same, and means normally urging the lever to a non-operating position.

The invention further contemplates such a gear embodying a rotatable main shaft extending longitudinally of the locomotive, and an indicator rotatable at a reduced speed about an axis parallel to the main shaft, arranged to give, at all times, a direct reading of the valve adjustment, preferably in terms of cut-off in percentage of piston stroke, said indicator being readable from the rear.

The invention also involves such a reverse gear with a shaft rotated by a motor, wherein means responsive to extremes of operation of said shaft will automatically render the motor ineffective.

The invention further contemplates such a gear, which, though of a rotating-shaft type, is nevertheless capable of rapid adjustment, and, if desired, of different selective rates of operation, which rates may be predeterminedly set and/or adjusted; and wherein the rate selecting valve may also be used as a shut-off valve.

Still further, the invention contemplates such a gear adapted for control by a small hand-lever in the cab, which, with a direct motion forward or backward puts into operation, either forward or backward, a rotative motor which actuates the gear, said lever being automatically moved to its neutral position if released, and also automatically moved to its neutral position, whether released or not, when the reverse gear reaches either extreme limit of its intended range of operation.

The invention furthermore contemplates the coordination, in such a gear, of a locomotive "Booster" motor control, and preferably also the drifting control, for operation in proper relation to the adjustment of the valve motion mechanism.

Still further, the invention contemplates the coordination, with the main reversing shaft, of one or more of the following: the "Booster" motor control, the drifting control, the indicator, and the safety limit or centering device for the manual lever.

Additionally, the invention contemplates employment of a locking device normally serving as a lock for the gear in any adjusted position, the said device being associated with the operating lever for the gear, preferably by having an actuating element pivoted on the lever fulcrum, so that the latch or lock may be released by the grip of the engineman when he grasps the operating lever. When the present gear is employed as a pilot for a reverse gear of the "Precision" or other type, such a locking device is an added safeguard in addition to any locking device which may be employed in association with the reverse gear. Moreover, when the reverse gear of the present invention is directly coupled with valve motion mechanism which itself incorporates self-locking means, or means tending to maintain a given adjustment (as in the case of said Delano application), the locking device of the present invention is an added safeguard to the locking effect of the valve motion.

Other features contemplated by the invention are: the provision of means for manual operation of the mechanism in the event of failure of the motor or of the air supply thereto; the simplification of the operating connections between the motor and the parts actuated thereby, and the construction of the gear, including its motor, in such manner that the same can be mounted as a unit in the cab, in a position where it is readily operated and where the indicator can easily be read, while at the same time the unit does not encroach seriously upon the cab space.

How the foregoing objects and advantages, together with such others as are incident to the invention, are secured, will be evident from the following description, taken together with the accompanying drawings. In said drawings:

Figure 2 is a vertical longitudinal section through the mechanism of Figure 1, drawn to a larger scale, and with certain parts omitted;

Figure 3 is a transverse section, taken approximately on the line 3—3 of Figure 2, certain parts being omitted and others shown in section;

Figure 4 is a fragmentary transverse section taken approximately on the line 4—4 of Figure 2;

Figure 5 is a fragmentary detail of a cam or slotted shaft which forms a part of the indicator operating mechanism;

Figure 6 is a transverse section, substantially enlarged, taken approximately on the line 6—6 of Figure 2, illustrating the operating lever, the valve mechanism, and certain related parts;

Figure 6A is a sectional view, auxiliary to Figure 6, but on a smaller scale, illustrating the combined shut-off and adjustable rate-selecting valve;

Figures 9B and 9F, showing the back and front ends, together illustrate in somewhat diagrammatic side view a locomotive (minus tender) employing the power reverse gear of the present invention, in association with an installation of poppet valves and valve gear embodying features of both the Woodard and Delano applications hereinbefore mentioned; and Figures 10 and 11 illustrate the essentials of another embodiment of my invention, Figure 10 being a side elevation and Figure 11 being a section on the line 11—11 of Figure 10 and showing most of the parts in rear elevation.

By reference first to Figures 9B and 9F, it will be seen that there is illustrated a Pacific type locomotive, having driving wheels W, pilot truck wheels P, trailer truck wheels T adapted to be actuated by an auxiliary or "Booster" motor B, mechanism for actuating the main drivers including pistons, one of which is illustrated at RP, and cranks RC and LC coupled by the usual rod assembly with a pivotal driving connection to the crossheads at RS and LS.

The locomotive further has valve chests at each end of each cylinder, containing admission poppet valves AV and exhaust poppet valves EV, which are actuated from cam boxes, that for the near cylinder being shown at RB; the cam shafts therein being oscillated through the linkages shown, from the valve motion housed in the box VM.

The valves may also be caused to open, for drifting, purposes, through the intermediation of the drifting device D (Figure 9F), the internal mechanism of which need not be shown, as it may follow the construction illustrated in said Woodard application, which also illustrates most of the essentials of the valve chests and the valve motion mechanism. Likewise, the auxiliary motor B need not be shown in detail, as it may follow one or more of the commercial forms known by the trade-mark "Booster." The drifting device D and the "Booster" motor B are, however, indicated, in association with certain fluid pressure conduits for controlling them from the improved power reverse gear of the present invention.

Similarly, the details of the valve motion are not shown, but this mechanism may follow the general design of said Woodard application, and may be controlled through a rotating adjusting and reversing shaft S in a manner similar to that disclosed in said Delano application. Shaft S may be coupled through the additional shaftings S1 and S2, connected through right-angle gear boxes G and associated universal joints, to the final connecting coupling 23 of the power reverse gear in the cab C. Compressed air for actuating the power reverse gear and its coordinated mechanisms, may be taken from the main air reservoir R, by way of the main air supply pipe A, which has a couple of supply branches A1 and A2.

Figure 1:
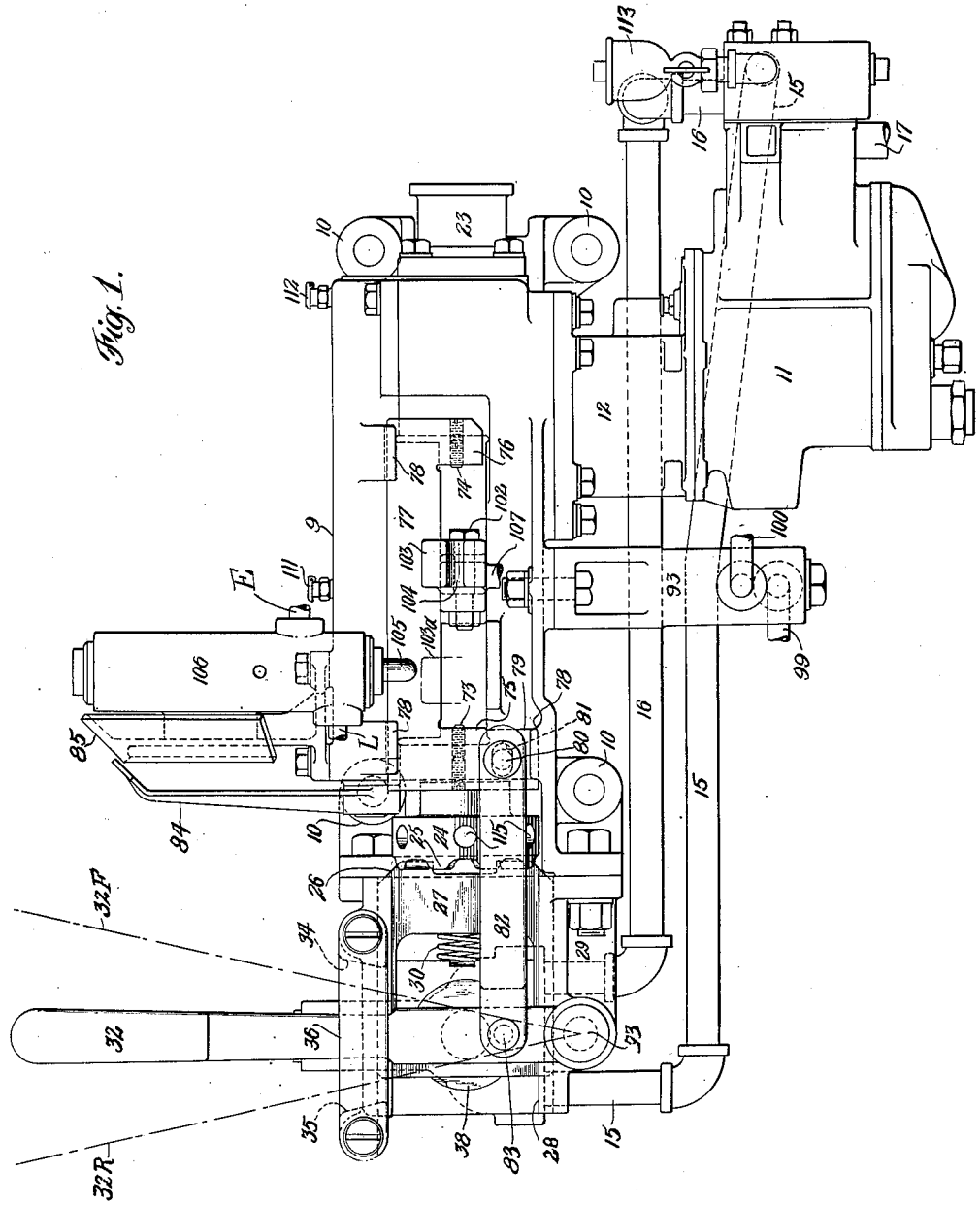
Figure 1 is a side elevational view of a typical embodiment of the power reverse gear of the present invention, with certain parts shown only fragmentarily.

Referring now to Figures 1 and 2, it will be observed that the reverse gear is carried in a frame 9, which has four apertured lugs 10 by which it may be mounted in any convenient location, as for example on a bracket located at the right side of the boiler backhead in the cab of the locomotive. The reversible air motor 11 is rigidly secured to the frame 9 by means of the intermediate frame extension 12 which also encloses a packing 13 to form a seal around the upper end of the motor shaft 14. Since reversible air motors are commercially available, the details of said motor 11 are not shown herein. However, the pipes for delivering compressed air from the control valve mechanism to the motor to actuate the same for forward and reverse operation, are shown respectively at 15 and 16. The motor exhaust is also shown, at 17.

The rotatable reversing shaft 18, mounted in the frame by bearings 19 and 20, is geared to the motor shaft by a pair of bevel gears 21, 22, and carries at its forward end a connecting flange member 23 which is normally coupled by a universal joint or other suitable means to the reversing shafting of the valve motion mechanism for actuating the latter, as indicated in Figures 9B and 9F. Alternatively, between the power reverse gear unit of the present invention and the valve motion mechanism of the locomotive there may be interposed one of the ordinary power reverse gears, such as the "Precision" gear above referred to. If the takeoff connection 23 is coupled up to the reversing shaft of a valve motion mechanism of the character illustrated in said Delano application (which latter has a self-locking screw thread to prevent movements of the valve motion mechanism from affecting the adjustment determined by the power reverse gear), it will be obvious that in such an installation the shaft 18, through shafting S2, S1, and S, will be locked in any given position of adjustment by virtue of the self-locking feature of the valve motion mechanism. The same would be true in any installation wherein the present mechanism was coupled up to any ordinary valve motion mechanism through the intermediation of any suitable self-locking threaded shaft or equivalent device.

An additional lock is, however, provided in the present unit itself, as will now be described. On the rear end of shaft 18 is fixed a locking wheel 24 which has around the periphery of its rear face a series of locking teeth or lugs 25, normally in locking engagement with a pair of similar lugs 26 formed on the front end of a locking plate 27 which is slidable in guideways 28 formed in the valve bracket 29.

The locking plate 27 has a lateral projection secured thereto and forming a spring-receiving socket 27a adapted to cooperate with spring 30, which spring, at its other end, bears against a fixed abutment 31, formed as a part of the valve bracket 29. The spring 30 thus serves to advance the locking plate into the position shown in Figure 2, in which the lugs 26 engage with lugs 25 of the locking wheel 24. This holds the power reverse gear shaft 18, and consequently the valve gear itself, in any position of adjustment to which it has been set. Upon movement of the reverse lever 32 from the neutral or mid position shown in Figure 1 toward either the forward position or the reverse position, indicated in chain dotted lines at 32F and 32R, the lock is released or disengaged, through mechanism shown in Figures 2 and 6, as will now be described.

In the transverse sectional view of Figure 6, it will be seen that the reverse lever 32 is at its lower end pivoted on a part of the valve bracket 29 by means of a fulcrum pin 33. The throw of the reverse lever is limited by stops 34 and 35 (Figure 1) formed at the forward and rear ends of the guide bar 36. Below said guide, the lever 32 has at its inner face a vertical slot formed by a pair of lugs 37. A rotatable cam member 38 has formed on its outer face a vertical cam bar 39, which is normally contacted at the rear by the vertical bar 40 which joins the upper and lower bars 41, 41 (Figures 2 and 6) which form part of the locking plate 27. Cam bar 39 at its upper end has an outwardly projecting pin 42 which engages the lugs 37 of the hand-lever 32, through the intermediation of a floating bushing 43.

From the above it will be seen that upon movement of the lever 32 either forwardly or backwardly it will turn the pin 42 through an arc having as its center the center of rotation of the cam member 38. In either direction of movement from the mid position, the vertical cam bar 39 will take an angular position, so that one end or the other thereof will push rearwardly against the vertical bar 40 of the locking plate 27, and thus retract said plate against the pressure of spring 30, and withdraw locking lugs 26 thereof out of engagement with locking lugs 25 of the locking wheel member 24. Therefore, initial movement of the reverse lever 32 unlocks the reverse gear shaft. This also starts the movement of the control valve mechanism, as will now be described.

Figure 8:
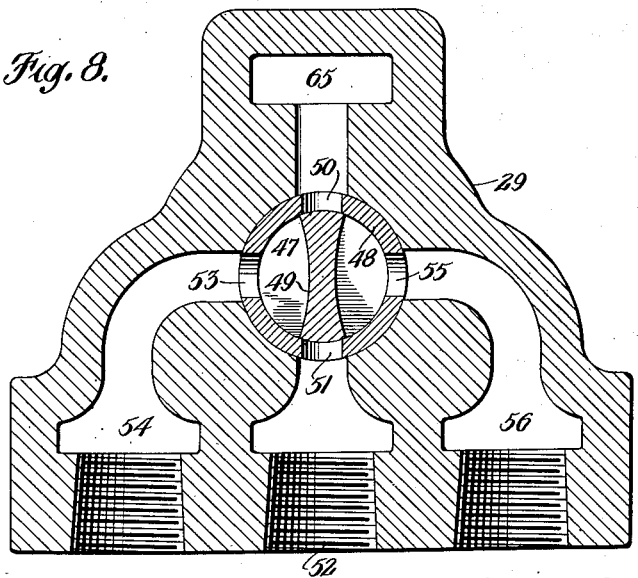
Figure 8 is a section taken approximately on the line 8—8 of Figure 6, illustrating the distributing valve and associated parts.

At the inner end of cam member 38 there is a reduced portion 44 (Figure 6), having at its inner face a transverse slot 45 in which is engaged a shoulder 46 formed integrally with the distributing valve 47. Said valve is rotatably mounted in a bushing 48 (Figure 8) and has a vertical web 49 which in mid position of the reverse lever blanks off the inlet port 50 and the exhaust port 51, the exhaust pipe outlet being indicated at 52.

When the reverse lever is pushed forward the valve 47 is rotated (clockwise in Figure 8) until communication is established between inlet port 50 and forward control port 53, which communicates by passage 54 with the supply pipe 15 leading to the air motor 11. Similarly, when the reverse lever is pulled back, the valve 47 establishes communication between inlet port 50 and reverse control port 55, which communicates by passage 56 with the reverse supply pipe 16 to the motor.

At the time when ports 50 and 53 are in communication for delivering air through pipe 15 to the motor, ports 55 and 51 are also in communication, for draining the pipe 16 to the atmosphere. The outlet 52 thus relieves pressure in one delivery line or the other, as the case may be, although it will be understood that this need not serve as the exhaust line of the motor 11, since the latter has its own exhaust outlet 17. Bleed ports 57 and 58, as seen in Figure 6, are provided to take care of any leakage along the periphery of the valve member 47.

Figure 7:
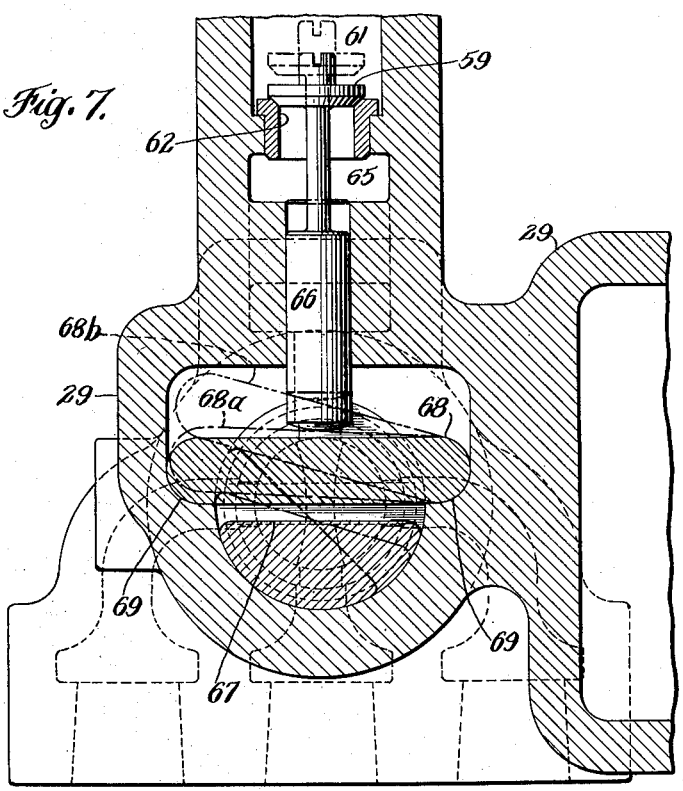
Figure 7 is a section taken approximately on the line 7—7 of Figure 6, illustrating the poppet control valve and associated parts.

Although the valve 47 will alternatively open either the forward or the reverse supply line to the motor, it is not solely depended upon to prevent air flow to the motor when the mechanism is in midposition. It will be evident from Figures 6 and 7 that the poppet valve 59 is in series with the valve 47, and operates sequentially with respect thereto. The compressed air supply pipe 60 may take air from any suitable source, such as air brake reservoir, and delivers it to the chamber 61 above the valve 59, as will later be described with reference to Figure 6A. The air pressure normally acts to keep valve 59 on its seat 62, as does also the spring 63 which abuts against the valve cap 64. The passage 65 delivers air to the inlet port 50 of valve 47 only after poppet valve 59 has been raised from its seat by means of the stem or plunger 66. The valve stem 66 is actuated by the flattened surface 67 formed in the intermediate portion of the cam member 38, by means of a floating intermediate lever 68. This lever or bar, as seen in full lines in Figure 7, normally rests on seats 69 formed in the body 29, with clearance relative to the cam surface 67 and the bottom of the valve stem 66, when the parts are in midposition.

When the reverse lever 32 has been moved forward far enough to unlock the shaft 18, the distributing valve 47 has been partially opened, and the intermediate lever 68 has come to the position indicated in dot-and-dash lines at 68a, i. e. the latter has just come into contact with the bottom of valve stem 66. Further movement of the reverse lever 32 turns the intermediate lever 68 to the position 68b, which fully opens the valve 59, as shown in dot-and-dash lines at the top of Figure 7. Air is then flowing past both control valves, through the supply pipe 15 into the motor 11, and the motor is actuated to rotate shaft 18 in a sense to adjust the valve motion mechanism toward or into its forward range. Adjustment in this direction continues until the engineman releases the lever 32, whereupon the locking spring 30 moves the locking plate 27, the cam bar 39, and thus the hand-lever, cam and valve parts, etc., back to neutral position, whereupon the valve gear is locked and the valve motion mechanism is also locked in whatever position of adjustment it has then reached.

The same operations occur, of course, if the hand-lever 32 is pulled in the reverse position 32R. The cam parts turn in the opposite direction, but they open the valves in a similar manner, to deliver air to the supply pipe 16. It will be noted that the spring 30 serves the dual functions of a return spring for the hand-lever 32 and an actuating spring for the locking plate 27.

If the engineer holds the lever 32 in either of its operating positions, until the reverse gear reaches either limit of its intended operation, the lever 32 and all the other operating parts will thereupon be automatically forced to their neutral position, thus shutting off the motor 11. This is accomplished by means of the traveling block 70 and associated parts, as will now be described.

The block 70 is threaded upon a screw 71 formed on the shaft 18, and moves backward (i. e. toward the left in Figure 2) when the shaft 18 is operated in a direction to adjust the valve motion for forward operation. This block is guided in its longitudinal travel by a pair of guide bars 72 (best seen in Figure 4), which also prevent rotation of the block. When the block moves to one extremity or the other of its travel, it engages one or the other of the adjustable abutment screws 73, 74, mounted respectively in the downward projections 75, 76, carried by the centering plate 77 which is longitudinally slidable in guides 78 (Figures 1 and 3). An ear 79 on the projection 75 carries a control pin 80 engaging a slot 81 in the centering link 82 which at its rear end is pivotally coupled at 83 to the reverse lever 32. The slot 81 provides just enough freedom for normal movement of the control lever 32 to either of its extreme positions 32F and 32R. If, however, said lever is unintentionally held too long in one position, and the block 70 comes to either end of its travel, it returns the reverse lever to its midposition, by means of the centering plate, centering link, and interconnections just described.

The control limiting block 70 also has other functions, as will now appear.

Its second function is to move the indicator arm or pointer 84 over the dial 85 (which as shown in Figure 3 is calibrated to show cut-off adjustment in terms of percentage of piston stroke). This operation will appear from Figures 2 to 5. In the top of the block 70 is a groove 86, within which fits the indicator shaft 87, said shaft being rotatably supported at 88 and 89, and fixedly carrying at its projecting rear end 90 the pointer 84. A helical cam slot 91 in the surface of the shaft 87 engages a fixed pin 92 mounted in the top of the block 70.

Rotation of shaft 18, moving block 70 forwardly or rearwardly, rotates indicator shaft 87, but through a much-reduced angular movement as compared with the rotation of shaft 18. When the apparatus is coupled to a valve motion mechanism combining the features of said Delano and Woodard applications, about twelve complete rotations of shaft 18 would correspond to complete travel of the valve motion mechanism from forward full gear to reverse full gear position. The corresponding range of the indicator 84 is about one-third of a turn, as shown by the length of the dial in Figure 3.

In the valve motion mechanisms shown in said Woodard and Delano applications, there is an intermediate range, between the normal forward range and the normal reverse range, which is known as the neutral or mid gear range, and the limits of this range are indicated on the dial 85 by the symbols "Mid." If it is desired, the indicator can be made to stand or "dwell" at its central position, marked "Drift," during a predetermined portion of the movement of the mechanism in said mid gear range. This is accomplished by making a break in the curvature of the helical cam 91 in the indicator shaft 87, i. e., by making the slot 91 parallel with the axis of said shaft, in the region marked 91D in Figure 5. The period of "dwell" of the indicator may be varied by changing the length of the parallel portion 91D of slot 91. Preferably the period of "dwell" is approximately equivalent to that portion of the mid-gear range in which the drifting mechanism is operative, as is brought out just below.

This brings us to the third function of the block 70, i. e. the control of the drifting mechanism. This is shown, in Figures 2 and 4, as being carried out by a drifting control valve 93 which is carried on the bottom of the frame 9. The lower end of block 70 has a projecting surface 94, of a length corresponding to the desired period of operation of the drifting valve. When said surface engages the plunger 95 of said valve, it causes a valve member 96 to close off the exhaust port 97, and causes the valve member 98 to open communication from an air supply line 99 (coupled to chamber 99a) to an air delivery line 100 (coupled to chamber 100a), see Figures 2 and 3. The air delivered to pipe 100 is conveyed to the drifting mechanism (as indicated in Figures 9B and 9F) and throws the same into operation. The duration of this operation, measured in terms of the total travel of the reverse gear, is determined by the length of the surface 94 on block 70 plus such portion of the adjoining beveled surfaces 94a as is effective to operate the drifting control valve 93. The portion 91D of the cam slot 91 in the indicator shaft 87 may be made to approximately coincide in length with that portion of the travel of the block 70 which is effective to operate the drifting valve, so that the indicator pointer 84 stands at the "drift" position on the dial through this portion of the range of adjustment.

Turning now to the fourth function of the block 70, it will be observed from Figures 1, 3 and 4 that the block carries a lateral extension 101 on which is pivoted at 102 a booster motor control latch 103 (known per se). The latter has a groove 104 which can be caused to engage the operating stem 105 of the booster control valve 106, by swinging the latch upwardly around its pivot 102 by means of the normal latch handle 107.

This action is effective only when the reverse gear is at or adjacent the full gear forward position of adjustment, i. e., when the booster latch 103 has been carried to the position shown in chain dotted lines at 103a in Figure 1. The longitudinal extent of the latch and its groove 104 is such that if the latch handle is raised when the reverse gear is in the position of extreme forward adjustment, the Booster will continue to operate until the cut-off adjustment has been shortened a predetermined amount, corresponding to the usual cut-off setting for a locomotive speed of about 25 to 35 M. P. H., whereupon the latch has moved out of engagement with the valve stem 105, and the latch drops by gravity into the position shown in Figure 3.

The actual control of the Booster B from the pilot valve 106 is by delivery of air from the branch supply line L to the line E which may be arranged to control the Booster entraining mechanism and/or the Booster throttle (not shown).

Since this operation of the Booster, and the construction of the Booster control valve 106 are both known per se, they need not be further elaborated upon.

Suffice it to say that the traveling block 70 cooperates with the Booster control valve, the drifting control valve, the indicator shaft, and the centering or control linkage to the hand-lever 32, in such manner that all of the four functions involved are properly coordinated with the operation of the power reverse gear and thus with the operation of the locomotive valve motion mechanism.

In order that the speed of operation of the power reverse gear may be altered at the will of the engineman, the present invention provides a means for altering the normal speed of rotation of the actuating motor 11. Such means may be in the form of a pressure reducing valve, having two positions which give different pressure reductions, and also a closed position to shut off air from the mechanism entirely. Such a valve is indicated at 108 in Figure 6A. Viewing this figure in association with Figures 6 and 9B, it will be seen that the valve 108 takes its supply from the branch air line A1, and delivers through pipe 60 which is coupled to the main control valve mechanism shown in Figure 6.

The control handle 109 for this valve, when in its full line position, acts as a shut-off valve, as shown. When the handle is moved to the position 109L it provides a relatively low pressure flow past the slightly open adjustment valve V1 to the pipe 60, this being the normal pressure for normal operation of the reverse gear. When moved to the position 109H it delivers a higher pressure, by way of the more widely opened adjustment valve V2, such pressure being designed to operate the motor 11 and thus the reverse gear at a rapid rate, to facilitate the operation when the engineer must reverse the valve gear quickly, as when taking slack. Where, as here shown, the selective flow rates through the valve 108 are by way of supplemental valves V1, V2, the latter may be adjusted by suitable screw-threaded stems, as shown, whereby to effect predetermined fixed adjustments of the two flow rates or pressures.

With the foregoing means of adjustment as to rate of operation of the mechanism, and with the adjustability of the stops or screws 73 and 74 on the centering plate 77, the mechanism may be adapted for a wide variety of installations.

Certain details of the mechanism, which aid in proper maintenance, operation, and adaptation of the mechanism to different installations and conditions, should also be mentioned, as follows:

The various bearings, the gears, and the motor are lubricated by oil cups 110, 111, 112, and 113, as seen in Figures 1 and 2. The graduation of the device may be altered by removing the studs 114 which hold the dial 85, and replacing the latter with a different dial. The shaft 18 and block 70 may be removed, and replaced by corresponding members having a thread of a different pitch, and the indicator shaft 87 can readily be replaced by one having a slot of different helical contour. In case of failure of the motor or of the compressed air supply, the mechanism may be operated in emergency by moving lever 32 to disengage the locking lugs 25 and 26, and then turning the wheel 24 by means of any suitable rod, which is insertable in the holes 115 provided in the periphery of said wheel.

The ease of mounting and removal of the motor, the simplicity of its driving connection with the main shaft, the flexibility and ease of control of the device, and the extreme simplicity of the indicator and its driving connection, will also be quite evident.

The alternative embodiment of the invention, illustrated in Figures 10 and 11, will now be described. In these figures, certain parts which have the same functions as the like parts in the first-described embodiment will be designated by similar or identical reference characters, even though some of them are of different shapes or are illustrated only in diagrammatic outline.

The reversible air motor 11 has its shaft 14 coupled to the reversing shaft 18a through bevel gears 21, 22. A suitable bracket or frame 9a with gear box 9b serves to journal the shaft 18a. A second shaft 87a, journaled in the gear box, serves to mount the indicator arm 84a, the end of which moves over a dial 85a having suitable graduations (not shown). Reduction gearing, for example, a train of spur gears, is located in the gear box 9b and couples the shaft 18a to the shaft 87a to rotate the latter at a reduced rate.

The control of the motor is through air pipes (not shown) similar to those numbered 15 and 16 in the first-described embodiment. Separate valves are employed for forward and reverse operation of the motor 11; the stem of a poppet valve for forward operation being shown at FV in Figure 10, while that for reverse operation is shown at RV. The pressure of the compressed air in the valve box VB (supplemented by springs if desired) acts to hold said valves in their seated positions, i. e., with their stems raised in juxtaposition to the control arms F1 and R1 formed integrally on the manual reverse lever 32a, which latter is pivoted at 33a. The lever is thus normally centered, and held in non-operating position, by means of the valve stems.

Associated with the control lever 32a, though independently pivoted on its axis 33a, is a latch controlling lever L, which is urged by the compression spring L1 to the position illustrated in Figure 10. The foot of lever L engages one end of a lever 116 which is pivoted at 117, the other end of said lever engaging a pin 118 extending through a slot 119 of a spring housing 36a. The spring in said housing normally urges the locking plunger or bolt 26a into engagement with the teeth 25a of the locking wheel 24a which is fast on the rear end of shaft 18a. The latter also carries a squared end 115a for attachment of a wrench or other tool for manual adjustment of shaft 18a in the event of failure of motor 11.

It will be observed that to operate the mechanism (shown in neutral position in Figure 10) so as to adjust the reverse gear to the full-gear forward position shown in Figure 11, the engineer grasps in his hand the levers 32a and L. This first presses lever L toward lever 32a, and through the connections 116 to 118 disengages the locking element 26a from the teeth 25a. The lever 32a is then pushed forward (clockwise in Figure 10), depressing the valve stem FV, and thereby operating motor 11 to rotate the shaft 18a in a direction for adjusting the locomotive valve gear into the range for forward operation of the locomotive. Assuming that this adjustment is carried to the full-gear position of Figure 11: if then the booster latch handle 107 (which is pivoted at 102a on the indicator arm) is swung outwardly, the booster latch arm 120 will engage and operate the stem 105 of the booster control valve 106. An adjustment of the mechanism from forward full gear position toward the intermediate position will result in a movement of arm 120 out of contact with valve stem 105, which will result in closing of the booster control valve, and dropping of the booster latch handle 107 to the position shown in Figure 10; after the manner of the operation fully described with reference to the first embodiment.

Further, the indicator shaft 87a carries a suitable cam 94a' for actuating the stem 95 of the drifting control valve 93. This operates in a manner similar to that described with reference to the first embodiment.

As a safety limit, and as a centering means for the manually controllable lever 32a, said lever carries a fixed rod or arm 121, projecting forwardly (as shown in Figure 10) to a position alongside the hub 122 of the indicator arm 84a (as seen in Figure 11). Said hub carries a pair of lugs or arms 75F and 76R, positioned and adapted, respectively, to engage the rod 121 when the mechanism has moved to the extreme forward adjustment or to the extreme reverse adjustment. Obviously, if the engineer holds the lever 32a in either of its operating positions (i. e., that to depress valve stem FV or that to depress valve stem RV), and fails to note that the mechanism is reaching its limit of adjustment, said lever will be automatically returned to the neutral position shown, when the mechanism has moved to a point where the indicator lug 75F (or the lug 76R, as the case may be) engages said rod 121 and moves it to neutral.

As to both forms of the invention, from the foregoing full description of the mechanism it is thought that all of the functions thereof will be readily understood, without further elaboration. It will also be apparent that all of the objects and advantages set out at the beginning of the specification are attained by the mechanism described, and that the details of construction and arrangement have other advantages which will be appreciated by those skilled in the art.

Certain features of the first of the two embodiments of the invention herein illustrated and specifically described are not a part of my invention, but are claimed in copending application of Major T. Forker, Jr., Serial No. 352,688, filed August 15, 1940, which issued as Patent No. 2,327,344 on August 24, 1943.

I claim:

1. In a locomotive power reverse gear operative by the engineman for adjusting and reversing the valve gear, a valve gear reversing element, a reversible fluid pressure motor connected to actuate said element, valve means adapted to effect reversal of direction of operation of said motor, control mechanism located in the locomotive cab comprising a direct-throw reverse lever movable in either direction from a neutral position and coupled to correspondingly operate said valve means for either direction of operation of said motor, positive lever-positioning means effective upon lever throw in either direction from neutral, and means, constituting part of the control mechanism in the cab, for effecting, at the will of the engineman, differences in fluid flow to said motor and thus different motor speeds in either direction of operation at positively-positioned lever locations on both sides of neutral, whereby quick reversal of the locomotive can be had in either direction for taking slack while retaining the capability of fine adjustment of the locomotive valve gear by the use of the same direct-throw reverse lever.

2. In a locomotive power reverse gear having a reversing shaft, a fluid motor for adjusting the same and a manual control for reversing said motor, a fluid line to the motor, means accessible to the engineman in the cab and movable at will, under normal operating conditions, from one to another of a plurality of selective control positions to alter the fluid flow to the motor whereby to provide different motor speeds for a given position of said manual control, and adjustment means for effecting predetermined fixed adjustments of the fluid flow for at least one of said selective control positions.

3. Locomotive power reverse gear equipment including a rotatable reversing shaft, a reversible rotative motor for driving said shaft, control mechanism for the motor including a lever movable in either direction from a mid position in which the motor is idle to respectively control rotation of the motor in the two directions, means for centering said lever, cut-off indicator means, main engine drifting control means, and mechanism for actuating said three means including a member movable under the influence of rotation of the reversing shaft and actuating connections between said member and the said three means adapted to positively coordinate them so that the centering means is made effective at the ends and the drifting control means at the mid-region of the range of operation of the cut-off indicator means.

4. Locomotive power reverse gear equipment including a rotatable reversing shaft, a reversible rotative motor for driving said shaft, control mechanism for the motor including a lever movable in either direction from a mid position in which the motor is idle to respectively control rotation of the motor in the two directions, means for centering said lever, cut-off indicator means, main engine drifting control means, booster motor control means, and mechanism for actuating said four means including a member movable under the influence of rotation of the reversing shaft and actuating connections between said member and the said four means adapted to positively coordinate them so that the centering means is made effective at the ends and the drifting control means at the mid-region of the range of operation of the cut-off indicator means, and the booster control means is made effective through a portion of said range near an end thereof.

5. Locomotive reverse gear equipment including a reversing shaft, engine drifting control means, a cut-off indicator, and operating connections between the reversing shaft and said control means and between the reversing shaft and said indicator, said connections being constructed and arranged to render said control means effective at the mid-region of the range of operation of the cut-off indicator.

6. Locomotive reverse gear equipment including a reversing shaft adapted to control the cut-off and direction of operation of the main engine, cut-off indicator means, main engine drifting control means, and mechanism for coordinating operation of said two means including an actuating member movable under the influence of movement of the reversing shaft, and control connections for said two means associated with said member, said connections being constructed and arranged to render said control means effective at the mid-region of the range of operation of the cut-off indicator.

7. Locomotive reverse gear equipment including a reversing shaft adapted to control the cut-off and direction of operation of the main engine, booster motor control means, cut-off indicator means, main engine drifting control means, and mechanism for coordinating operation of said three means including an actuating member movable under the influence of movement of the reversing shaft, and control connections for said three means associated with said member and adapted to positively coordinate them so that the booster motor control means and the drifting control means are respectively made effective in an end region and an intermediate region of the range of operation of the cut-off indicator means.

8. Locomotive reverse gear equipment including a reversing shaft adapted to control the cut-off and direction of operation of the main engine, a reversible motor for actuating the reversing shaft, control mechanism for the motor including a lever movable in either direction from a mid position in which the motor is idle to respectively control operation of the motor in the two directions, means for centering said lever, cut-off indicator means, main engine drifting control means, and mechanism for coordinating operation of said three means including an actuating member movable under the influence of the reversing shaft and control connections for said three means associated with said member adapted to positively coordinate them so that the centering means is made effective at the ends and the drifting control means at the mid-region of the range of operation of the cut-off indicator means.

9. In a locomotive power reverse gear, a frame, a main reversing shaft, a rotatable motor with a shaft drivingly coupled to the reversing shaft, a hand lever mounted for movement from a neutral position alternatively into a forward adjusting position and a rearward adjusting position, controlling means for said motor actuable by said hand lever, and a locking device arranged to lock said main reversing shaft to said frame independently of said hand lever and having a releasing member associated with said lever.

10. In a locomotive power reverse gear, a frame, a main reversing shaft, a rotatable motor with a shaft drivingly coupled to the reversing shaft, a hand lever mounted for movement from a neutral position alternatively into a forward adjusting position and a rearward adjusting position, controlling means for said motor actuable by said hand lever, and a locking device arranged to lock said main reversing shaft to said frame independently of said hand lever and having a releasing lever pivotally associated with said hand lever.

11. In a locomotive power reverse gear, a frame, a main reversing shaft, a rotatable motor with a shaft drivingly coupled to the reversing shaft, a hand lever mounted for movement from a neutral position alternatively into a forward adjusting position and a rearward adjusting position, controlling means for said motor actuable by said hand lever, and a locking device arranged to lock said main reversing shaft to said frame independently of said hand lever and having a releasing member movably associated with said lever in position to be actuated by the grip of the hand when said hand lever is grasped.

12. In a locomotive power reverse gear, a main reversing shaft, a rotatable motor with a shaft drivingly coupled to the reversing shaft, a manual control for said motor, a releasable lock for said reversing shaft having an operating element associated with said manual control and movable to release position irrespective of the condition of the motor, and means independent of said manual control for manually actuating said main reversing shaft in the event of failure of said motor.

WILLIAM E. WOODARD.